United States Patent
Muller et al.

[11] Patent Number: 6,072,473
[45] Date of Patent: Jun. 6, 2000

[54] METHOD AND DEVICE FOR MULTIMODE AND MULTIFUNCTION COMMUNICATION BETWEEN AN OPERATOR AND ONE OR MORE PROCESSORS

[75] Inventors: Jean Muller, Toulouse; Mariannick Vaquier, Limours, both of France

[73] Assignees: Aerospatiale-Societe Nationale Industrielle, Paris Cedex; Sextant Avionique, Meudon LaForet, both of France

[21] Appl. No.: 08/249,079

[22] Filed: May 25, 1994

Related U.S. Application Data

[63] Continuation of application No. 08/037,435, Mar. 26, 1993, abandoned.

[30] Foreign Application Priority Data

Mar. 26, 1992 [FR] France ..................... 9203644

[51] Int. Cl.[7] ............................................. G09G 5/00
[52] U.S. Cl. ............................................ 345/173; 345/156
[58] Field of Search ............................. 345/1, 173, 156; 340/971, 973; 341/23

[56] References Cited

U.S. PATENT DOCUMENTS

| | | | |
|---|---|---|---|
| 4,413,314 | 11/1983 | Slater et al. | 345/173 |
| 4,725,694 | 2/1988 | Auer et al. | 345/173 |
| 4,796,190 | 1/1989 | Cummings. | |
| 4,885,580 | 12/1989 | Nato et al. | 341/23 |
| 5,043,727 | 8/1991 | Ito | 340/984 |
| 5,047,754 | 9/1991 | Akatsuka et al. | 340/709 |
| 5,161,535 | 11/1992 | Short et al. | 340/712 |
| 5,295,062 | 3/1994 | Fukushima | 345/173 |

FOREIGN PATENT DOCUMENTS

| | | |
|---|---|---|
| 0129286 | 12/1984 | European Pat. Off. . |
| 0262991 | 10/1987 | European Pat. Off. . |
| 2241112 | 8/1974 | France . |
| 2938426 | 4/1981 | Germany . |
| 3043788 | 2/1991 | Japan . |
| 2190569 | 11/1987 | United Kingdom ............... 340/709 |

*Primary Examiner*—Regina Liang
*Attorney, Agent, or Firm*—Browdy and Neimark

[57] ABSTRACT

The system embodying the invention involves a communications instrument comprising a sensitive surface coupled to a processor ensuring management of a plurality of display elements, the dialogue between said instrument and said processor taking place according to a sequence comprising a first operational mode in which the sensitive surface is virtually divided into a plurality of zones corresponding isomorphically with the geometrical disposition of the display elements, and a second operational mode in which a variable displayed on a visualisation element is modified subsequent to displacement of the operator's finger on the sensitive surface. This system is notably suitable in the case of management of a large number of display elements and is highly ergonomic.

9 Claims, 4 Drawing Sheets

METHOD AND DEVICE FOR MULTIMODE AND MULTIFUNCTION COMMUNICATION BETWEEN AN OPERATOR AND ONE OR MORE PROCESSORS

This application is a continuation of application Ser. No. 08/037,435, filed Mar. 26, 1993 now abandoned.

BACKGROUND OF THE INVENTION

1. Field of the invention

This invention relates to a method and device for multimode and multifunction communications between an operator and one or more processors.

Its aim is more particularly, though not exclusively, to produce an ergonomic and easy-to-use comunications instrument which can also contribute to reducing the complexity and the volume of installations equipping pilots' cockpits in current aerodynes.

2. Description of the Prior Art

Generally, it is known that propositions have been made for numerous types of operator/processor dialogue instruments, the most common instruments being (static, dynamic, reconfigurable, etc.) keyboards or manipulators such as e.g. joy-sticks or mice.

These instruments can be used in numerous ways. For instance, certain keys can be associated with functions, others serving to enter data which may or may not be displayed as they are keyed in and which are only taken into account by the processor after a validation action.

The keyboard can also be used to displace a cursor on the screen so as to bring it into a predetermined area associated with an information that can be identified by the processor. Action on these validating means then enables this data to be taken into account by the processor.

It is this latter method which is used by manipulators such as mice, of which displacement on any surface entails a corresponding displacement of the cursor, and which comprise a validation key enabling validation (clicking) of the data indicated on the screen by the cursor.

In the case of reconfigurable keyboards, the shape, location and function of the keys can be modified, e.g. at each change of operating mode of the system.

Finally, the keyboard can comprise dynamic keys whose functions, which vary according to the different operating modes of the system, are displayed on the screen.

Experience has proved that these different communications instruments are not very suitable in the case of systems with a large number of operating modes and, in particular, in the case where communication is required with several processors each equipped with respective visualizing means.

It has been observed that the configuration of a keyboard is too rigid and that, even if it is reconfigurable, reconfiguration requires too much attention on the part of the pilot who will have considerable difficulty assimilating all the configurations. Likewise, displacement on the screen of a cursor by means of a manipulator is an operation which, in numerous cases, requires the operator's attention for too long (e.g. when it is a matter of a simple choice of processor with which one wishes to dialogue, of operating mode or of a variable one wishes to modify, etc.).

Another drawback with current instruments concerns their ergonomics, notably in the case of modification of a variable displayed on the screen.

This modification is usually obtained by pressing a key (e.g. + or −) which causes an incrementation or decrementation of the variable, and therefore a scrolling of this variable at a more or less fast speed, until the required value is attained. In this instance, there is no correlation between the operator's gesture and the scrolling speed of the variable, nor even between the gap between the current and required value of the variable and the amplitude of a displacement to be performed by the operator to obtain the required value.

Of course, to obtain this result, use is frequently made of control devices performing analog-to-digital conversion such as code wheels. However, this solution is incompatible with the multimode and multifunction character of the instrument embodying the invention.

OBJECT OF THE INVENTION

The object of the invention is therefore more particularly to obviate these drawbacks.

SUMMARY OF THE INVENTION

It proposes for this purpose a system for communcation between an operator and at least one processor using:

a plurality of display elements managed by said processor and laid out according to a predetermined geometrical disposition, these display elements being assignable to different functionalities, having an appropriate symbology for each of these functionalities and enabling a parameter in relation with this function to be displayed or not;

a communication instrument comprising a sensitive surface coupled to the processor so as to set up communication with the latter in order to ensure management of the display elements, according to an operating sequence comprising at least the following operational modes:

a first operational mode according to which, seen from the processor, the sensitive surface is virtually divided into a plurality of areas corresponding isomorphically with the geometrical disposition of the display elements, this first mode enabling the operator to select a display element and the functionality corresponding to it, by acting directly on the corresponding area of the sensitive surface, and by validating this selection by action on the validating means, a second operational mode which follows the first one, and in which a variable displayed on the selected visualization element is modified subsequent to displacement of an object such as the operator's finger on the sensitive surface, the processor then cyclically performing detection of the position of said object on said surface, determination of the displacement of the object between two successive positions, computation of a new value of the variable as a function of its value in the previous cycle and of the displacement thus determined, and display of a new value.

To these two operational modes can be added an additional operational mode notably in the case where the display element selected during the first operational phase ensures display of several parameters, this additional mode using an index that can be displaced in homothetic relation with the displacement of an object on the sensitive surface. A validating means is further provided for validating an area of the display element pointed out by the index, and the information corresponding to this area.

Advantageously, a means can be provided for ensuring that, subsequent to the selection of a display element or of a display area, but before validation of this selection, the selected display element (or area) is recognizable.

DESCRIPTION OF THE PREFERRED EMBODIMENTS

Embodiments of the invention will be now described, by way of non limiting examples, in reference to the accompanying drawings in which.

Figure 1:
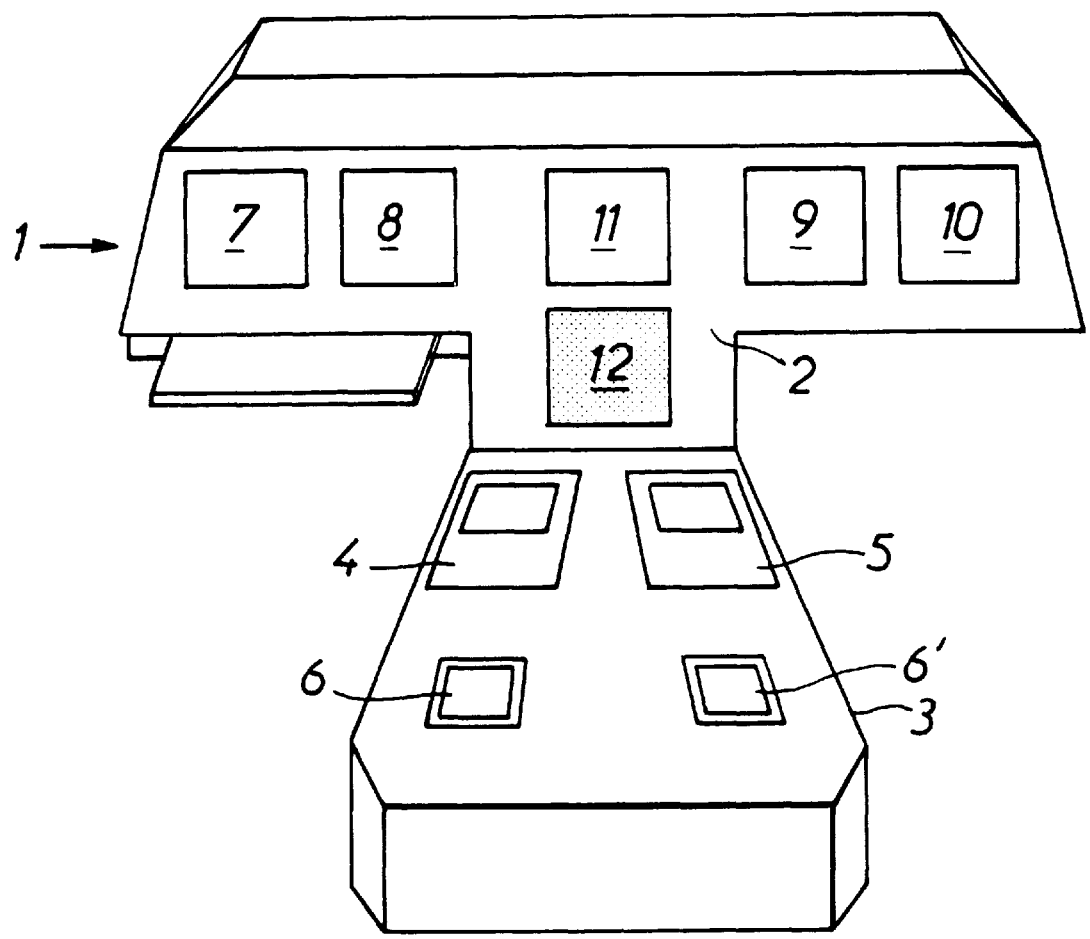
FIG. 1 is a schematic view in perspective of the front part and the central part of a cockpit of an aircraft comprising a plurality of display units driven from a single control constituted in this instance by a sensitive surface.
Figure 3:
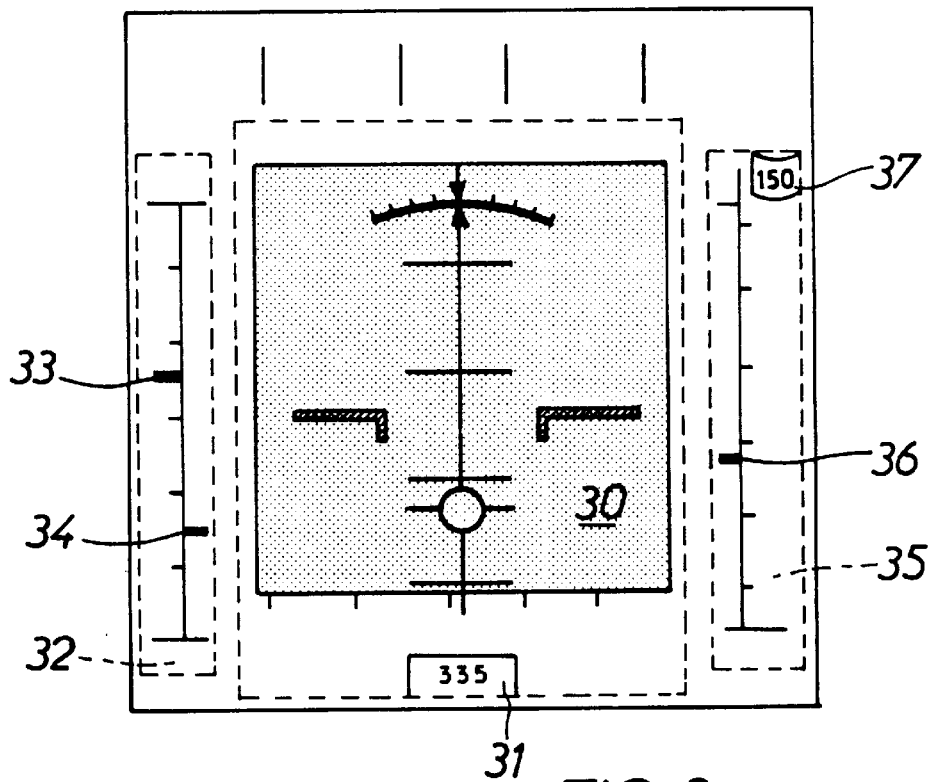
FIG. 3 is a schematic representation of the different elements displayed on the two screens of the Primary Flight Display (PFD) of the aerodyne.
Figure 4:
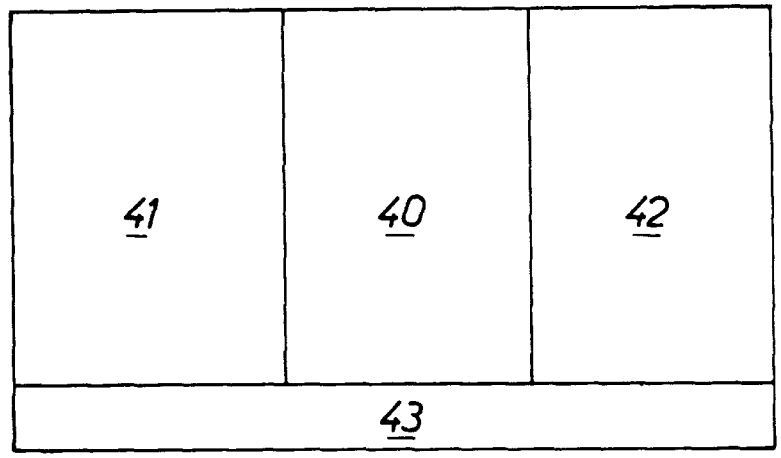
Figure 7:
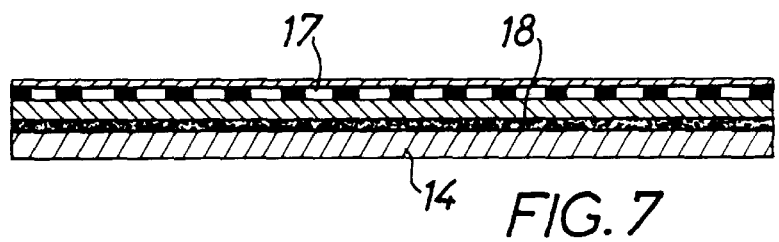
Figure 8:
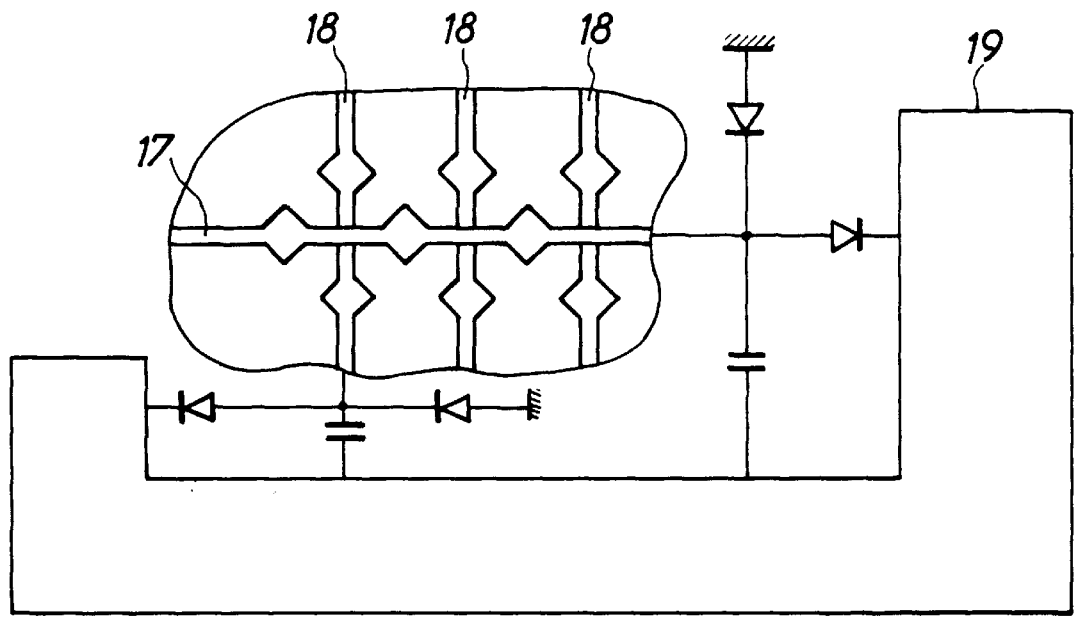
Figure 5:
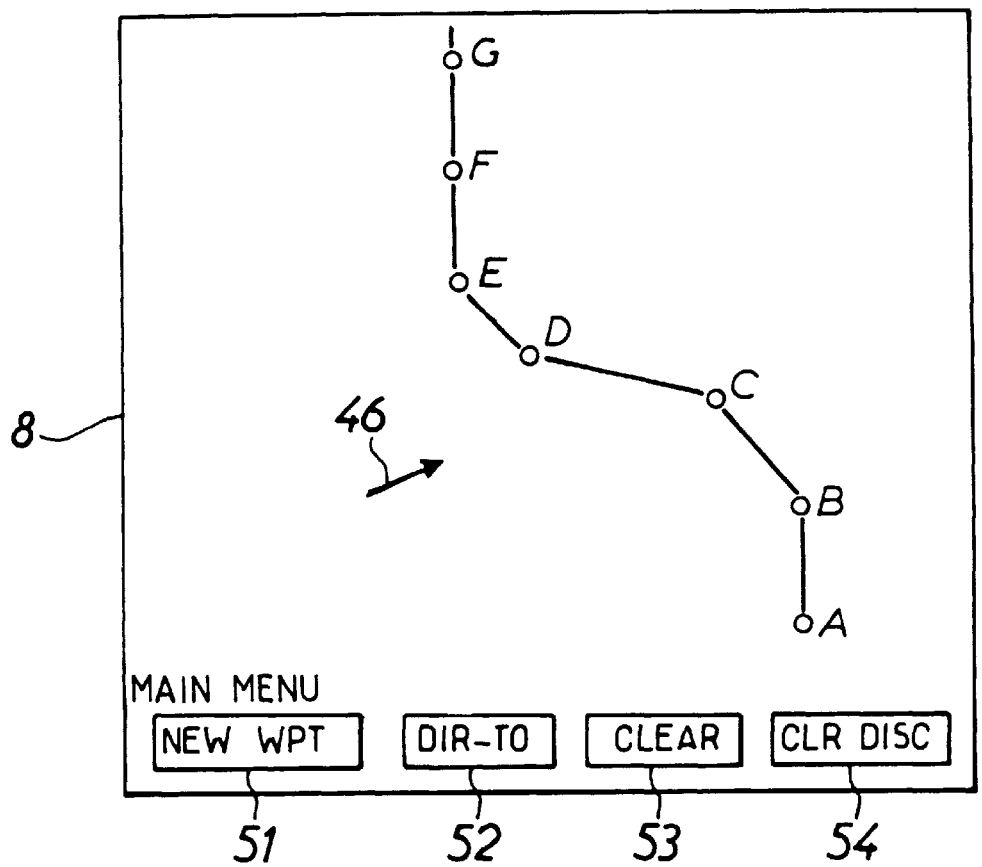
Figure 6:
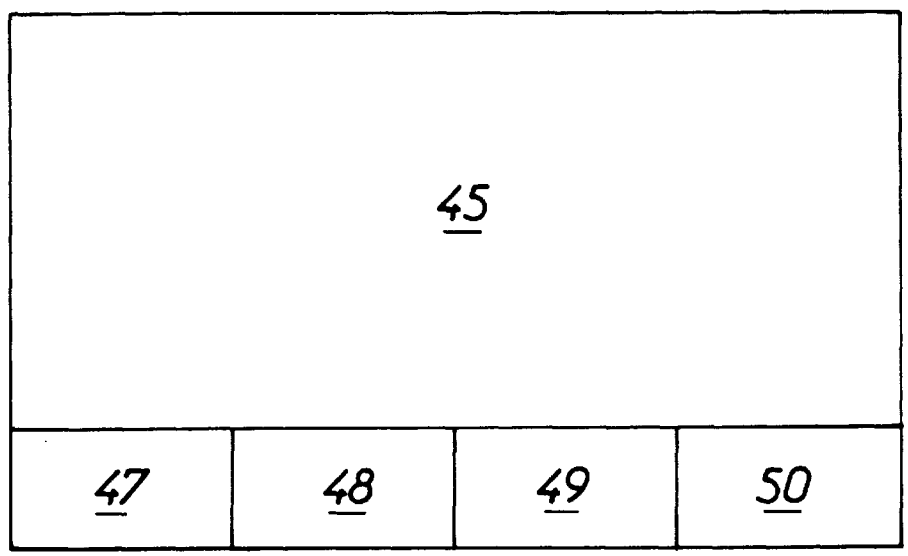

FIG. 4 schematically represents the composition of the areas of the sensitive surface for screens of the type of those represented in FIG. 3;

FIG. 5 is a schematic representation of an ND type (Navigation Display) display unit used in the cockpit represented in FIG. 1 during a flight plan reviewing phase;

FIG. 6 shows the composition of the areas of the sensitive surface in correspondence with the display of the ND display unit in the flight plan review mode;

FIG. 7 is a schematic representation in cross-section of a sensitive surface;

FIG. 8 is a partial view indicating the shape and distribution of the electrodes of the sensitive surface and of the electronic circuits associated with it.

DESCRIPTION OF THE PREFERRED EMBODIMENTS

The cockpit represented in FIG. 1 is designed for two pilots sitting side by side.

It comprises, beneath the windscreen of the aircraft (not represented) a substantially T-shaped vertical instrument panel 1 of which the central part 2 is extended downwards by a horizontal panel 3. The latter, which is slightly raised in relation to the floor of the cockpit, separates the spaces allocated to the two pilots. It supports a plurality of manual controls such as the throttles, the flap control levers, airbrakes, etc. Of these commands, the only ones represented are two keyboard/screen consoles 4, 5 arranged side by side (one per pilot) and two sensitive surfaces 6, 6' of which the role will be explained later in the description.

The keyboard/screen consoles 4, 5, usually called MCDU (Multipurpose Control Display Unit), are intended to enable dialogue between the flight management system and the pilot, e.g. with a view to reviewing a flight plan (in the latter case, this console enables entry of the singular points defining the flight plan and then modification of this flight plan).

The upper fascia of the instrument panel (forming the horizontal branch of the T) comprises five display screens, i.e.

two pairs of lateral screens 7, 8–9, 10, respectively disposed facing each of the pilots, and each comprising:
  a PFD type screen 7, 10 serving to display information of use for piloting, such as e.g. instataneous flight information (speed, altitude, course, trim, incidence . . . ),
  an ND type screen 8, 9 intended for the presentation of information relating to navigation (route to be followed, radio beacons, way points, etc . . . ) and an EWD type (ENGINE AND WARNING DISPLAY) central screen 11, for visualization of information from the centralized control system of the aerodyne, and more particularly, of information relating to the engines and warning messages.

The vertical branch of the instrument panel comprises, beneath the EWD central screen 11, an SD type (SYSTEM DISPLAY) screen 12 which is used to present the information relating to the housekeeping systems of the aerodyne.

These different screens, which are associated with respective processors, form a display system having multiple display elements with each of which the pilot must be able to dialogue, in as simple and natural a manner as possible.

In this system, each display element can consist in a screen or part of a screen, it being understood that a same screen can comprise several separate areas each comprising a subset of the display element that will be referred to hereinafter as "display sub-element".

It is clear that the shape and disposition of the screens inside the cockpit are theoretically fixed.

Conversely, the shape and disposition of the display sub-elements may vary within their respective screens, e.g. from one function mode to another.

In this context, the aim of the invention is more particularly the embodiment of a centralized control enabling the pilot to dialogue simply and ergonomically with all the display elements, as well as with the display sub-elements.

To achieve this, it proposes the use of a sensitive surface 6, 6' (one per pilot) coupled to the different processors associated with the display elements, assigned to each pilot, e.g. through a channel selection switch or even a link by common bus and/or appropriate input/output interfaces.

As schematically represented (FIG. 7), this sensitive surface 6 comprises a supporting element 14 having a rigid flat surface covered with a so-called "sensitive" covering enabling detection and localization of the presence of an object such as a pilot's finger on (or in the immediate vicinity) of said surface.

For this purpose, this sensitive covering can comprise two layers of electrodes 17, 18 connected to one another by conductive links according to a matrix configuration, one of the layers including the lines, while the other forms the columns (FIG. 8).

A scrutinizing device 19 applies an electric signal to these lines and columns and identifies those on which a signal variation has been detected, due to the proximity or the presence of the object of which detection of the position is required.

An embodiment of a link circuit has been indicated, for indicative purposes, between a line and a column on the one hand, and the scrutinizing device 19 on the other hand.

Advantageously, the position of the object will be determined by the center of gravity of the influenced area. A high resolution sensitive surface is thus obtained.

In this example, the sensitive surface bears no symbology. In fact, it must be usable irrespective of the symbology used by the different display elements.

As previously mentioned, this sensitive surface has several operating modes, i.e.

a plurality of display element selection modes, in each of which the sensitive surface is virtually divided into a plurality of areas corresponding isomorphically with the disposition, either of the display elements inside the cockpit or the display sub-elements inside any one of the displayed elements, a variable updating mode by displacement of an object, e.g. the pilot's finger, on the sensitive surface, a mode for selection of an area (corresponding to a function) inside a display element, this mode comprising guidance of a cursor by means of displacement of the finger on the sensitive surface, then validation of the required area once it has been marked by the cursor.

To these different modes can be added a "dynamic key" mode in which the sensitive surface is virtually divided into a plurality of control areas corresponding isomorphically with the screen areas in which are indicated the functions obtained subsequent to action on the areas of the sensitive surface.

Figure 2:
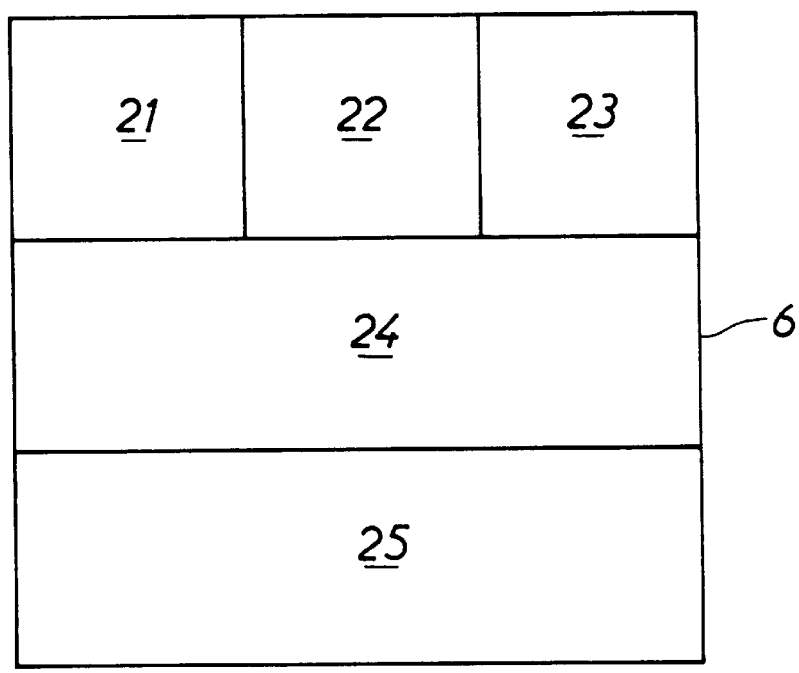
FIG. 2 is a schematic representation indicating the different areas of the sensitive surface corresponding isomorphically with the display units.

Initially, the sensitive surfaces are in the display element selection mode (in this instance, screens of the cockpit, FIG. 2).

Each sensitive surface is then virtually divided into five areas, divided over three levels, i.e.

three areas 21, 22, 23 disposed side by side to form the first level, these three areas corresponding respectively to screens 7, 8, 11 or 11, 9, 10 of the cockpit;

an area 24 occupying the entire second level and corresponding to screen 12, and an area 25 occupying the third level and corresponding to the keyboard/screen consoles 4 or 5.

To select a screen, the pilot need only put his finger on the area of the sensitive surface corresponding to this screen. This action causes a signalling of the screen in question (e.g. lighting of an indicator light). The pilot must then validate his choice by an action on the validating means. This validation has the effect of establishing a link between the sensitive surface 6 and the processor associated with the selected screen, and of causing a change of mode to adopt the one corresponding to said screen. Of couse, this new mode can be a selection mode for the displayed sub-elements figuring on the screen, an update mode for a variable, e.g. in the case of the image displayed on the screen forming an entity in which the variable is displayed, or a selection mode for an area of the screen by displacement of a cursor.

FIGS. 3 and 5 show two types of screens enabling these operating modes to be illustrated.

The PFD screen represented in FIG. 3 (corresponding to one of the screens 7 and 10 in FIG. 1) is thus divided into three parts each constituting a separate display element, i.e.

a rectangular central part 30 displaying a flight direction horizon according to a conventional symbology with a linear scale representing longitudinal and lateral trims and a circular scale enabling indication of the divergence between the current course value and an instructed value displayed in the window 31, a left-hand lateral band 32 extending the central part 30 to the left, this band 32 including a graduated vertical scale on both sides of which are disposed two indices, i.e. an index 33 indicating the speed of the aircraft and an index 34 indicating the instructed speed, and a right-hand lateral band 35 extending the central part 30 to the right, this band 35 including a vertical scale on both sides of which are disposed two indices, i.e. an index 36 indicating the altitude of the aerodyne and an index 37 constituted by a window in which the instructed altitude is displayed.

After selection of this screen by touching the area 21 of the sensitive surface 6, then a validation obtained by an action on the validating means, the sensitive surface 6 undergoes a reconfiguration and finds itself divided into three main areas, visible in FIG. 4, i.e. an area 40 corresponding to the central part 30 of the PFD screen, a left hand lateral part 41 corresponding to the left-hand lateral band 32 and a right-hand lateral part 42 corresponding to the right-hand lateral band 35.

Action on one of these parts of the sensitive surface 6, e.g. part 41, initially causes a luminous frame bordering the left-hand lateral band 32 to appear (represented in broken lines).

Validation of this selection causes a change of operating mode of the sensitive surface 6 which automatically changes to the modification mode for a variable.

In this operating mode, the sensitive surface 6 is no longer virtually divided: it enables determination of the amplitude and direction of displacement of the pilot's finger, irrespective of its position on the sensitive surface 6, computation of a new value of the variable (in this instance, the altitude instruction) as a function of the amplitude of this displacement, and display of the new values of the variable (in this instance, the altitude instruction) by means of the index 34 provided for this purpose.

Action on parts 40 and 42 triggers a similar process enabling the pilot to respectively modify the course and speed instructions.

In the example represented in FIG. 4, the sensitive surface 6 further comprises a lower area 43 on which action followed by a validation causes the system to return to the screen selection mode and recomposition of the sensitive surface according to the disposition represented in FIG. 2.

Selection of an ND screen (e.g. screen 8) by action and validation on area 22 of the sensitive surface 6 enables the pilot e.g. to switch to the review mode for the lateral flight plan of the aircraft.

In this operating mode which is partially illustrated in FIG. 5, the sensitive surface 6 can be divided into two parts, i.e.

a first part 45 serving to command the displacement of a cursor 46 on the screen 8 by means of a displacement in homothetic relation to that of the pilot's finger on the sensitive surface, and to validate an area of the screen indicated by the cursor 46, a second part delimiting areas 47, 48, 49, 50 constituting dynamic keys of which the functions (which vary from one mode to another) are indicated on the bottom of screen 8 in areas 51, 52, 53, 54 situated in isomorphic correspondence with areas 47, 48, 49, 50.

Initially, the flight plan displayed on the screen comprises a path running through the singular points A to G each situated in the center of the sensitive areas indicated by the small circles.

At the bottom of the screen, the four rectangular areas display e.g. the four review modes proposed by the main menu, i.e.

the "NEW WPT" mode (insertion of a new point in the flight plan), the "DIR-TO" mode which enables definition of a point towards which the aerodyne must head from its current position, the "CLEAR" mode which enables a singular point to be erased, the "CLR DISC" mode which enables a discontinuity to be deleted.

Selection and then validation of one of the dynamic keys causes a secondary menu to be displayed in areas 51 to 54. The first part 45 of screen 8 can then be used for displacement of the cursor 46, in the homothetic mode, e.g. for designation and/or validation of an existing singular point and, if required, creation of a new singular point.

What is claimed is:

1. A system for communication between an operator and at least one processor, using:
   a plurality of display elements managed by said processor and laid out according to a predetermined geometrical disposition, a variable being displayed on each of these display elements,
   a communication instrument separate from said display elements comprising a touch-sensitive surface coupled to said processor so as to set up communication with the latter in order to ensure management of said display elements,
   validating means coupled to said processor for enabling said operator to validate selecting actions. and
   said processor comprising:
      means for managing said sensitive surface according to a first operating mode using a virtual division of said sensitive surface into a plurality of virtual areas, and means for adjusting the respective shapes and dispositions with respect to each other of said areas so as to correspond isomorphically with said geometrical disposition of said display elements,
      means for detecting a selecting operation of one of said areas corresponding to a display element, this selecting operation being performed by the operator by acting directly on any point of said area of said sensitive surface and by validating this action by acting on said validating means,
      means for cyclically detecting the position of an object such as the operator's finger on said sensitive surface,
      means for managing said sensitive surface according to a second operating mode subsequent to said selecting operation using means for determining the displacement of the object between two successive positions on said sensitive surface,
      means for computing a new value of the variable displayed on a previously selected display element as a function of a current value of said variable and of the determined displacement of said object on said sensitive surface, and
      for displaying said new value on said previously selected display element.

2. The system as claimed in claim 1, wherein said display elements consist in display screens that are separate from one another.

3. The system as claimed in claim 1, wherein said processor comprises means for managing said sensitive surface according to a third operating mode using a cursor that is displaced on a previously selected display element in homothetic relation with the displacement of an object on said sensitive surface, and means enabling validation by the operator of the area of said previously selected display element pointed out by said cursor, and, at the same time, the information corresponding to this area.

4. The system as claimed in claim 1, wherein said processor further comprises means for managing said sensitive surface according to a fourth operating mode using a division of the sensitive surface delimiting virtual dynamic keys, the disposition of said dynamic keys corresponding respectively to the disposition of areas of the previously selected display element in which are indicated functions assigned to said dynamic keys.

5. The system as claimed in claim 1, wherein said processor further comprises means for signalling said selected display element before being validated by said operator through said validating means.

6. The system as claimed in claim 5, wherein said signalling means display a luminous frame around said display element.

7. A system for communication between an operator and a least one processor, using:
   a plurality of separate display screens managed by said processor, and laid out according to a first predetermined geometrical disposition, at least a first of these display screens comprising at least two display elements laid out according to a second predetermined geometrical disposition, a variable being displayed on each of said display elements,
   a communication instrument separate from said display screens and comprising a touch-sensitive surface coupled to said processor so as to set up communication with the latter in order to ensure management of said display screens,
   validating means coupled to said processor for enabling said operator to validate selecting actions, and
   said processor comprising:
      means for managing said sensitive surface according to a first operating mode using a virtual division of said sensitive surface into a plurality of virtual areas corresponding isomorphically with said first geometrical disposition,
      means for detecting a first selecting operation of one of said areas corresponding to said first display screen, this selecting operation being performed by the operator by acting directly on said area of said sensitive surface and by validating this action by acting on said validating means,
      means for managing said sensitive surface subsequent to said first selecting operation according to a second operating mode using a virtual division of said sensitive surface into a plurality of virtual areas corresponding isomorphically with said second geometrical disposition,
      means for detecting a second selecting operation of an area corresponding to one of said display elements subsequent to said first selecting operation, this selecting operation being performed by the operator by acting directly on said area of said sensitive surface and by validating this action by acting on said validating means,
      means for cyclically detecting the position of an object such as the operator's finger on said sensitive surface,
      means for managing said sensitive surface subsequent to said second selecting operation according to a third operating mode using means for determining the displacement of the object between two successive positions on said sensitive surface,
      means for computing a new value of the variable displayed on the previously selected display element as a function of its current value and of the determined displacement of said object on said sensitive area, and
      means for displaying said new value on said previously selected display element.

8. The system as claimed in claim 1, wherein the display elements consist in parts of a same screen (display sub-element).

9. A method for modifying the value of a variable displayed on a display sub-element of a display element in a system for communication between an operator and a plurality of display elements managed by at least one processor and using a communication instrument separate from said display elements and coupled to said processor and comprising a touch-sensitive surface and validating means for enabling said operator to validate selecting actions, said display elements having different shapes and sizes and being not contiguous and laid out according to a first predetermined geometrical disposition, at least a first of said display elements comprising at least two display sub-elements laid out according to a second predetermined disposition, each of said display sub-elements displaying a value of a variable, said method comprising successively at least the steps of:

managing said sensitive surface by said processor according to a first configuration wherein said sensitive surface is divided into a plurality of virtual areas corresponding isomorphically with said first geometrical disposition, each area corresponding with a respective display element, detecting a first selection of said first display element, this first selection being performed by the operator by acting directly on the area of said sensitive surface corresponding to said first display element, and by validating this action by acting on said validating means, managing said sensitive surface by said processor according to a second configuration wherein said sensitive surface is divided into a plurality of virtual areas corresponding isomorphically with said second geometrical disposition, each area corresponding with a respective display sub-element of the previously selected display element, detecting a second selection of a display sub-element, this second selection being performed by the operator by acting directly on the area of said sensitive surface corresponding to said display sub-element and by validating this action by acting on said validating means, cyclically performing detection by said processor of the position of an object such as the operator's finger on said sensitive surface, managing said sensitive surface by said processor according to a third configuration for determining the displacement of the object between two successive positions, computing a new value of the variable displayed on the previously selected display sub-element as a function of its value in a previous cycle and of the displacement thus determined, and displaying said new value on said previously selected display sub-element.

* * * * *